Patented Aug. 23, 1949

2,480,020

UNITED STATES PATENT OFFICE 2,480,020

COATING COMPOSITION AND METHOD OF MAKING

William Helms, Pendleton, Ind.

No Drawing. Application March 11, 1947, Serial No. 733,983

3 Claims. (Cl. 106—119)

This invention relates to coating compositions, and more particularly is concerned with a coating composition formed with lime for the purpose of forming a finish coating for plaster surfaces or for application to any other solid surface, such as insulation board, wood, glass or the like.

The primary object of the present invention is to provide a slow drying, water resisting, lime coating composition for plaster finishes, to be used on base coats of plaster or to be applied to wood, glass, insulation board, or other surfaces.

A still further object of the present invention is to provide a plastic or flexible plaster coating composition which will be slow setting and non-shrinking.

Another advantage of the present invention is that the coating composition, formed in accordance with my invention, is sufficiently slow drying to allow a subsequent sand finish or texture finish to the surface which will adhere firmly thereto.

A still further advantage of the present invention is the provision of a coating composition of this type which can be applied to the surface to be coated by either a brush, spray gun, or trowel.

A further characteristic of the present composition is its greatly increased adhesive characteristics providing for a bond to any hard surface, such as a plaster base, wood, glass or the like, which prevents its separation from such base, and also the fact that the composition will stand for relatively long periods of time in a liquid condition suitable for application.

In addition, the present composition also has the characteristic of withstanding temperatures appreciably below the freezing temperature, allowing its use either inside or outside during relatively cold weather.

Other objects and advantages of the present invention will appear more fully from the following detailed description thereof, which will enable those skilled in the art to prepare compositions of this type, and to understand the operation thereof.

In preparing the present composition, I find that the preferred method of preparation constitutes adding to quick lime an aqueous solution of calcium chloride and glucose in a quantity sufficient to provide complete hydration of the lime. This aqueous solution, of course, while the lime is being hydrated, gives up its moisture and the agitation of the solution, during the hydration process, results in a homogeneous mixture of the calcium chloride and glucose in the lime, the entire mixture being reduced to a dry composition which is then ground to commercial fineness. The calcium chloride and glucose apparently co-act during hydration to impart to the composition greatly improved adhesive and water-resistant characteristics.

Preferably, the aqueous solution is made up by adding four to five parts by weight of calcium chloride and one part by weight of glucose to water to form an aqueous solution, which is then admixed with agitation into the quick lime. The resulting heat developed by the reaction of the water with the lime drives the water off in the form of steam, producing a dry composition which can then be further ground to the desired fineness for subsequent use.

This dry mixture may then be suitably packaged and, when delivered to the location where the coating is to be applied, is admixed with a sufficient quantity of water to provide the proper consistency for either brush, spray gun, or trowel application. If desired, sand may also be admixed into the mixture in order to provide a rough sand finish for a wall, ceiling, or the like, while various pigmentation or coloring may be added to provide a colored finish.

Since the composition is slow drying, ample time is provided after the coating has been applied to the desired surface for producing the desired texture or surface thereon.

I have found that the mixture possesses very definitely improved characteristics of adhesion due to the adhesive character of the glucose and, for example, when applied to a glass or porcelain surface, will adhere so firmly thereto as to cause chipping or cracking of the glass or porcelain prior to removal. Also, when applied to a plaster base or brown coat, the removal of the coating composition also causes chipping out of the plaster base to which it has been applied, which differentiates materially from the normal finish type plasters or keen cements heretofore used for water resistant hard surfacing. It appears that the glucose made from corn syrup has adhesive qualities when in the solution not found if a sugar solution is used.

Also, since the coating composition dries slowly, I have found that there is relatively no shrinkage and that a hard water resistant sealing surface can be produced which will not check or crack, which heretofore has not been possible with the ordinary plaster without the use of an admixture of gauging plaster.

As a specific example of the composition, I find that the preferred mix for a composition of this type consists of four to five pounds of calcium chloride mixed with one to one and one quarter pounds of glucose and formed into an aqueous solution with approximately two and one half gallons of water. This solution is then mixed and agitated with quick lime in the proportions of about two quarts of the solution with fifty pounds of dry quick lime. The resulting hydration process removes all the water leaving a dry powder which may then be refined to the desired commercial fineness. This powder is subsequently mixed with water to the desired coating consistency, and applied either by brush, spray gun, or trowel, as desired.

Of course, depending upon the specific application, the relative proportions of the mixture can be varied within limited ranges without departing from the underlying principles of the invention, that is, the provision of a coating having very high adhesive quality, and being non-shrinking and water resistant.

I am aware that various minor changes may be made in the composition herein described and therefore do not intend to be limited to the specific example herein set forth, but only insofar as defined by the scope and spirit of the appended claims.

I claim:

1. A powder for use as a plaster finish coating composition composed of hydrated quick lime, calcium chloride and glucose in the proportions of 250 parts of quick lime to 5 parts of calcium chloride and 1 part of glucose.

2. A stable slow setting waterproofing composition, capable, when mixed with water to paint-like consistency, to withstand freezing, composed of quick lime, calcium chloride and glucose in the proportions of 250 parts lime to 5 parts calcium chloride to 1 part of glucose mixed homogeneously in water to complete hydration.

3. The method of forming a powder suitable as an aqueous adhesive non-shrinking water-resistant finished coating when applied in solution form to a smooth surface which comprises forming an aqueous solution containing from four to five pounds calcium chloride, one to one and one quarter pounds of glucose and about two and one-half gallons of water, mixing the solution with quick lime in the proportion of about two quarts of solution with fifty pounds of dry quick lime to produce complete hydration of said lime, and grinding the resulting composition to a fine powder.

WILLIAM HELMS.

REFERENCES CITED

The following references are of record in the file of this patent:

UNITED STATES PATENTS

| Number | Name | Date |
|---|---|---|
| 798,755 | Thomlinson | Sept. 5, 1905 |
| 1,953,924 | Blank | Apr. 10, 1934 |
| 2,418,431 | Scripture | Apr. 1, 1947 |

FOREIGN PATENTS

| Number | Country | Date |
|---|---|---|
| 357,119 | Great Britain | 1931 |
| 371,257 | Great Britain | 1932 |
| 480,681 | Great Britain | 1938 |